Oct. 5, 1954     I. J. STEMLER     2,690,684
SHIFT RAIL INTERLOCK

Filed May 26, 1953     2 Sheets-Sheet 1

INVENTOR.
Ignatius J. Stemler
BY
Harness and Harris
ATTORNEYS.

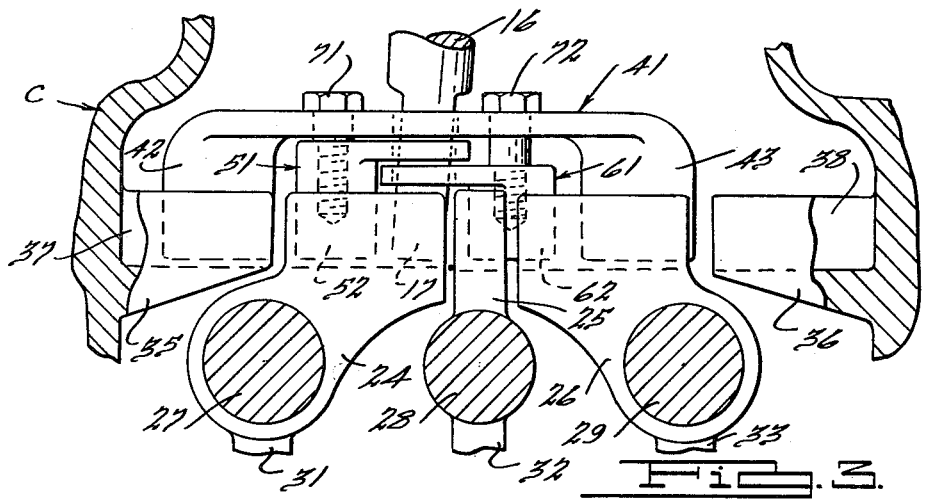

Patented Oct. 5, 1954

2,690,684

UNITED STATES PATENT OFFICE 2,690,684

SHIFT RAIL INTERLOCK

Ignatius J. Stemler, Detroit, Mich., assignor to Chrysler Corporation, Highland Park, Mich., a corporation of Delaware Application May 26, 1953, Serial No. 357,439

13 Claims. (Cl. 74—477)

This invention relates to manually operable change speed transmissions for motor vehicles or the like and particularly to a novel locking means for the transmission shift rail linkage that will prevent so-called "gear lock-up." A good example of "gear lock-up" is the condition that exists when the transmission control lever is positioned in neutral or in one of the speed ratio drive positions and one of the shift rails of the transmission has been accidentally shifted to a position conditioning the transmission for drive through some other speed ratio gear train. Such an accidental shift of a shift rail can result from the inertia forces acting on the several shift rails during fast gear shifting or from impact forces applied when the vehicle suddenly strikes an obstruction. Under such circumstances, the accidental shift of the shift rail or rails may condition the transmission controls such that it is impossible to affect movement of the vehicle in the desired direction or in any direction or even prevent return of the several shift rails to positions where they may be readily operated by the transmission shift control lever.

It is a primary object of this invention to provide a locking means for relatively shiftable transmission shift rails that will prevent "gear lock-up," that is the undersirable condition wherein the transmission is conditioned for drive through one gear ratio when another gear ratio has been preselected by the transmission shift control lever.

It is a further object of this invention to provide a locking means for a plurality of relatively shiftable transmission shift rails that will automatically lock all but the selector engaged shift rail in preselected positions at all times.

It is still another object of this invention to provide a transmission shift rail locking means that will lockingly engage each shift lever engaged shift rail before it is disengaged from the shift lever to thereby prevent shift of the shift rails independently of the shift lever by inertia or impact forces.

Other objects and advantages of this invention will become readily apparent from a reading of the following description and a consideration of the related drawings wherein:

Fig. 3 is a fragmentary sectional elevational view similar to Fig. 2, but showing the shift rail control elements shifted to a drive transmitting position; and Fig. 4 is an exploded view of the shift rail locking means embodying this invention.

Figure 1:
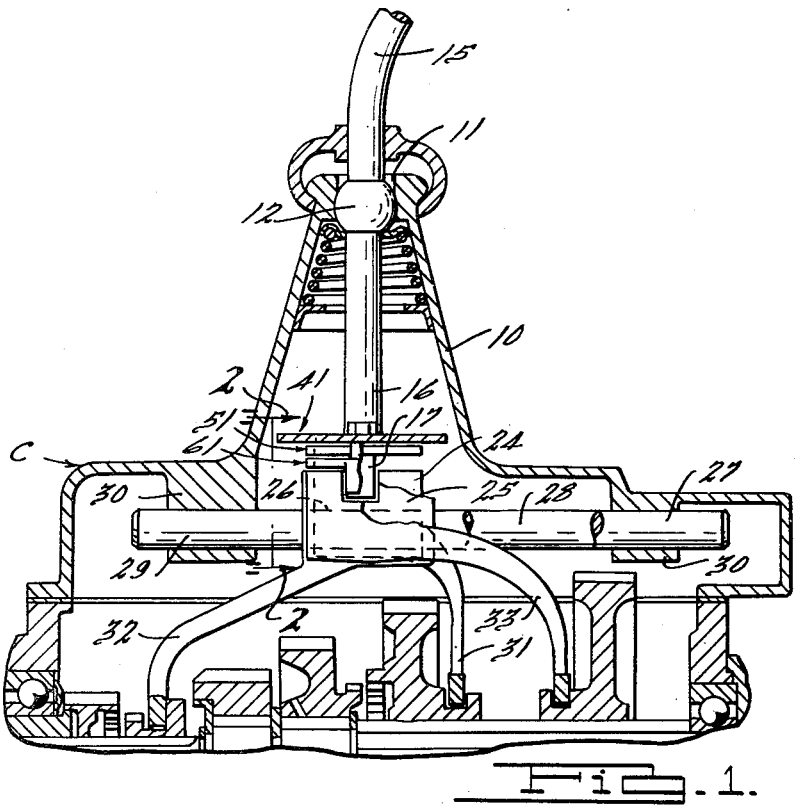
Fig. 1 is a fragmentary sectional elevational view of the upper portion of a manually shiftable, multi-speed, power transmission unit.

Fig. 1 shows the upper portion of a transmission case or housing C. Housing C has an upwardly projecting, hollow, cone-like formation 10 that is formed at its upper end with a ball receiving socket 11. Socket 11 receives a ball-like formation 12 that is an integral part of the transmission shift control lever 15. Shift control lever 15 has a finger-like portion 16 extending downwardly below the lever supporting ball formation 12. The flattened free end 17 of the control lever finger 16 is adapted to be selectively engaged with mating channel-like recesses 21, 22, or 23 (see Fig. 4) formed in the upper sides of the collar elements 24, 25 and 26 respectively, that are fixedly mounted on the parallelly arranged, relatively shiftable, shift rails 27, 28 and 29 respectively. Shift rails 27, 28, 29 are slidably supported in bores formed in housing flange portions 30. Each of the shift rails 27, 28 and 29 mount a fork-like finger element 31, 32 and 33 respectively (see Fig. 1 particularly) that is engageable with a shiftable gear element of the transmission gear box. As the gear box gearing forms no part of this invention, it is not thought that a description of the gearing or shifter forks 31, 32, 33 is required. Suffice it to say that relative shifting of the shift rails 27, 28, 29 by the shift control lever portion 16 brings about changes in the drive transmitting gearing combinations that produce several different speed ratio drives. As can be observed from Figs. 1 and 2, the transmission gearing is shown conditioned for no-drive or neutral whereas Fig. 3 shows the shift rails rearranged to provide for activation of a preselected speed ratio drive.

Projecting inwardly from the inner side of the transmission casing C, at the level of the shift rail collars 24, 25, 26, are a pair of opposed horns or studs 35, 36. These horns or studs 35, 36 are each formed with a channel-like recess 37 and 38 respectively in their upper sides. These horns or studs 35, 36 provide anchor means that cooperate with the after described outer rail locking plate 41 and center rail locking plates 51, 61, to continually lock all but the shift lever engaged shift rail to the transmission casing C. By having all rails except the shift lever engaged rail anchored to the transmission casing C during shifting movements, it is impossible for inertia loads or impact loads to accidentally shift any of the shift rails and thus a "gear lock-up" condition cannot develop.

Figure 2:
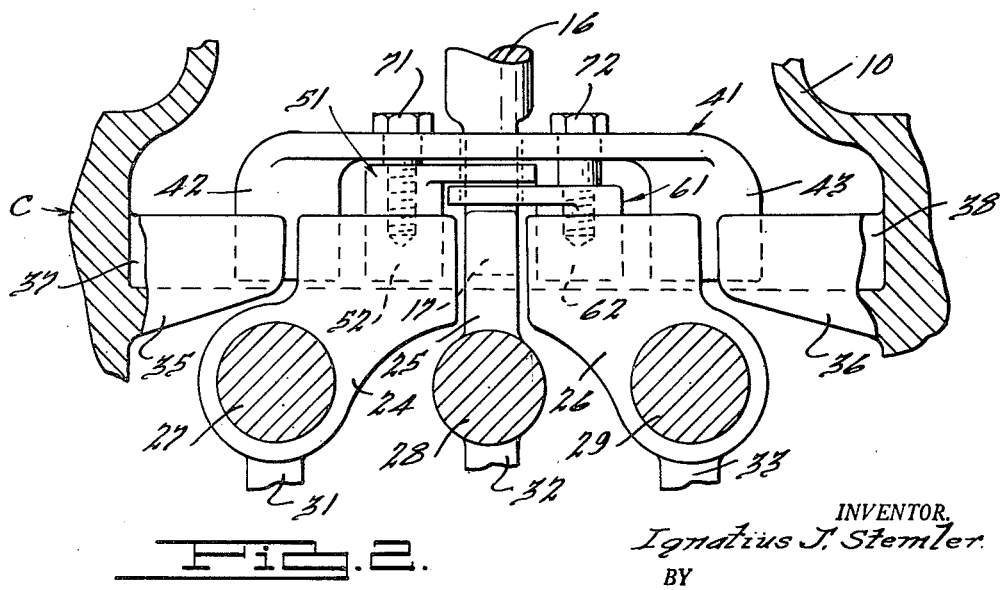
Fig. 2 is a fragmentary sectional elevational view of the upper portion of the transmission gear box shown in Fig. 1 when the shift rails are located in a neutral position, the view being taken along the line 2—2 of Fig. 1 looking in the direction of the arrows.

The specific locking means utilized to prevent "gear lock-up" is shown in an exploded view in Fig. 4. Fig. 2 shows this specific locking means applied to a three rail transmission control linkage and arranged in the neutral or no-drive position. In the neutral or no-drive position the flattened end portion 17 of the shift lever finger 16 is engaged with the recess 22 in the collar 25 on the center shift rail 28. As will appear from the subsequent description, the center rail 28 can be shifted at this time whereas each of the outer shift rails 27 and 29 is anchored to the casing C by means of the outer rail locking plate 41. Fig. 3 shows the rail locking means of Fig. 2 rearranged, due to movement of the shift lever 15, so that the left outer shift rail 27 can be shifted forwardly or rearwardly. When shift lever finger portion 16 is moved to the location shown in Fig. 3 then the locking plates 41, 61 cooperate to anchor the center shift rail 28 and the right outer shift rail 29 to the transmission casing C. The movement of the shift lever finger portion 16 to the right to actuate outer shift rail 29 will cause the locking plates 41, 51 to anchor the shift rails 27, 28 to the casing C.

The shift rail locking means disclosed comprises an outer rail locking plate 41 that is U-shaped in cross sectional configuration and a pair of center rail locking plates 51, 61 that are each L-shaped in cross sectional configuration. Outer rail locking plate 41 has a pair of depending lug-like legs 42, 43 that are adapted to be seated in the recesses 37, 38 in the casing horns 35, 36 and in the recesses 21, 23 in the outer rail collars 24, 26. Outer rail locking plate 41 has its flat, plate-like, body portion 44 pierced by three parallelly extending slots 45, 46, 47. Slots 45 and 47 are of such size as to slidably receive the bolts 71, 72. Center slot 46 in plate 44 is of such size as to slidably receive the flattened end 17 of the shift lever finger 16.

The center rail locking plates 51, 61 are substantially identical although the lug 52 of plate 51 is slightly longer than the lug 62 of the plate 61. The lug 52 of plate 51 contains a threaded bore 53 that receives the threaded end of the bolt 71. The plate portion of the center rail locking plate 51 has an elongated slot 54 that is adapted to slidably receive the flattened end 17 of shift lever finger 16. Center rail locking plate 61 has its lug portion 62 pierced by a threaded bore 63 that receives the threaded end of the bolt 72. The plate portion of the locking plate 61 is formed with an elongated slot 64 that is adapted to slidably receive the flattened end 17 of the shift lever finger 16.

When the shift rail locking plates 41, 51, 61 are assembled in the transmission (see Fig. 2), the plate portions of the plates 41, 51 and 61 are positioned in overlapping relationship with the slots 46, 54, 64 aligned for the reception of the shift lever finger portion 17. The bolt 71 connects the outer rail locking plate 41 to the center rail locking plate 51. However, due to slot 45 in plate 41, the plate 51 can be shifted relative to the plate 41 in a direction lengthwise of the shitf rail 27. Likewase, the bolt 72 connects the outer rail locking plate 41 to the center rail locking plate 61 and the slot 47 in the plate 41 permits the plate 61 to be shifted relative to the plate 41 in a direction lengthwise of the shift rail 29.

Fig. 2 shows the neutral or no-drive condition when the outer shift rails 27, 29 are locked to the casing C by the outer rail locking plate 41. At this time the lug 42 on the left side of plate 41 is seated in the recesses 37, 21 and it locks rail 27 to casing horn 35. Also at this time the lug 43 on the right side of plate 41 is seated in recesses 38, 23 and this locks rail 29 to casing horn 36. As shift rail 28 is not connected to either of the casing horns 35 or 36 at this time, rail 28 may readily be shifted by manipulation of the shift lever finger portion 17 that is seated in the center rail collar recess 22. The aligned slots 45, 54, 64 in the overlying plates 41, 51, 61 permit movement of the shift lever finger 16 and the rail 28 relative to the plates 41, 51, 61.

When the shift rails are in the neutral position (see Fig. 2), on disengaging the shift lever finger portion 17 from the center rail recess 22 and moving the lever portion 17 leftward into the recess 37 in the collar on the outer rail 27 (see Fig. 3) so as to permit subsequent shift of the outer rail 27, then the center rail locking plate 61 is simultaneously moved leftward by the shift lever finger portion 17. This leftward movement of the plate 61 moves the lug 62 of the plate 61 into the recess 22 in the center rail collar 25 and now the center rail 28 is locked to the right outer rail 29 by lug 62. Furthermore, the center rail 28 is locked to the right outer rail 29 even before the shift-lever finger portion 17 fully disengages the center rail collar recess 22 and moves into the left outer rail recess 21. Thus with the center rail 28 locked to the right outer rail 29, even before the time the selector finger portion 17 leaves the recess 22 and becomes engaged in the recess 21 in the left outer rail 27, it will be seen that it is impossible for the center rail 28 or the right outer rail 29 to shift independently of the shift lever portion 17 because the right outer rail 29 is locked to the transmission casing C at this time by the outer locking plate 41. Outer rail locking plate 41 at this time has its right lug 43 seated in the recess 23 in rail collar 26 and its left lug 42 seated in the recess 37 in casing horn 35. When the elements are arranged as shown in Fig. 3 then the left outer rail 27 is unlocked from the casing C and the aligned, superimposed slots 46, 54, 64 permit movement of the shift lever finger portion 16 to effect shift of the outer left rail 27 in a lengthwise direction. During this shift of the left outer rail 27 by the shift lever, the center rail locking plate 51 is also shifted with the rail 27 for it is locked to rail 27 by the lug 52. The slot 45 in the outer rail locking plate 41, that receives the bolt 71, permits the center rail locking plate 51 to shift relative to the outer rail locking plate 41.

On disengaging the shift lever finger 17 from the left outer rail recess 21, by movement of the shift lever finger 17 back towards the center rail recess 22, the shift lever finger 17 will simultaneously move the outer locking plate 41 rightward and as the shift lever finger portion 17 moves out of the left rail recess 21 the lug 42 of the outer rail locking plate 41 will move rightward and into the recess 21 (see Fig. 2) in the left outer rail collar 24 so as to lock the left outer rail 27 to the casing horn 35. As was the case with the rail 29 during engagement of the shift lever finger portion 17 with the left outer rail recess 21, on disengagement of the lever finger portion 17 from left rail recess 21, the outer locking plate lug 42 moves rightward to lock the left outer rail to the casing C before the shift lever portion 17 is fully disengaged from the left outer rail recess 21. This prevents the left outer rail from being shifted independently of the shift lever by inertia or impact loads.

The foregoing description of engagement and disengagement of the shift lever finger portion 17 with the left outer rail 27 applies equally to the right outer rail 29 so repetition of the shift operations with regard to the right outer rail is considered unnecessary.

From the above description of this invention it is thought to be obvious that the locking device disclosed is simple, foolproof and one that positively locks those shift rails not engaged by the selector finger so as to prevent the several rails from being shifted independently of the shift lever by impact or inertia forces.

I claim:

1. In a shiftable gear transmission, a casing, a plurality of relatively shiftable shift rails slidably mounted in said casing, a shift lever selectively engageable with said shift rails to effect shift thereof, a plurality of shift rail locking plates, a first one of said plates having anchor portions engageable with said casing and selectively engageable with certain of said shift rails to prevent relative movement between the anchor engaged rail and the casing, means connecting said shift lever and said first plate, and a second one of said plates having an anchor portion adapted to be selectively engaged with a pair of said shift rails to control relative movement therebetween, said second plate having another portion connected to said shift lever to provide for controlled movement of said second plate by said shift lever, said second plate also having other portions connected to said first plate by means permitting relative movement therebetween.

2. In a shiftable gear transmission, a casing, three parallelly arranged, relatively shiftable, shift rails slidably mounted in said casing, a shift lever selectively engageable with said shift rails to effect shift thereof, an outer rail locking plate bridging said rails and having anchor portions at opposite sides thereof engageable with mating formations in said casing to prevent shift of said outer rail locking plate lengthwise of said rails, said outer rail locking plate being slidably mounted in said casing and connected to said shift lever for movement thereby transversely of said rails whereby portions of said outer rail locking plate may be selectively engaged with the outer of said shift rails to prevent lengthwise shift thereof, and a pair of center rail locking plates each having an anchor portion engageable with portions of an outer rail and with the center rail to prevent relative shifting movement therebetween, said center rail locking plates each having other portions engageable with said shift lever to provide for shift of the center rail locking plates by said shift lever, and means connecting said center rail locking plates to said outer rail locking plate permitting relative movement between said connected plates lengthwise of the rails.

3. In a shiftable gear transmission, a casing, three parallelly arranged, relatively shiftable, shift rails slidably mounted in said casing, a shift lever selectively engageable with said shift rails to effect shift thereof, an outer rail locking plate bridging said rails and having anchor portions at opposite sides thereof engageable with mating formations in said casing to prevent shift of said outer rail locking plate lengthwise of said rails, said outer rail locking plate being slidably mounted in said casing and connected to said shift lever for movement thereby transversely of said rails whereby said anchor portions of said outer rail locking plate may be selectively engaged with the outer of said shift rails to prevent shift of said outer rails in a lengthwise direction, and a pair of center rail locking plates each having an anchor portion engageable with portions of an outer rail and with the center rail to prevent relative shifting movement therebetween, said center rail locking plates each having other portions engageable with said shift lever to provide for shift of the center rail locking plates by said shift lever, and means connecting said center rail locking plates to said outer rail locking plate permitting relative movement between said connected plates lengthwise of the rails, the anchor portions of said locking plates being so proportioned that the shift lever engaged rail is always anchored to the casing before the shift lever is completely disengaged therefrom so as to prevent movement of the shift rails independently of the shift lever.

4. In a shiftable gear transmission, a casing, three parallelly arranged, relatively shiftable, shift rails slidably mounted in said casing, a shift lever selectively engageable with said shift rails to effect shift thereof, an outer rail locking plate bridging said rails and having anchor portions at opposite sides thereof engageable with mating formations in said casing to prevent shift of said outer rail locking plate lengthwise of said rails, said outer rail locking plate being slidably mounted in said casing and connected to said shift lever by a slotted connection that provides for movement of the outer rail locking plate transversely of said rails whereby said anchor portions of said outer rail locking plate may be selectively engaged with the outer of said shift rails and said casing to prevent movement thereof lengthwise of said rails, and a pair of center rail locking plates each having an anchor portion simultaneously engageable with portions of an outer rail and with the center rail to prevent relative shifting movement therebetween, said center rail locking plates each having slotted portions engageable with said shift lever to provide for shift lever effected shift of the center rail locking plates in directions both transversely and longitudinally of said shift rails, and pin and slot means connecting said center rail locking plates to said outer rail locking plate permitting relative movement between said pin connected plates lengthwise of the rails.

5. In a shiftable gear transmission, a casing, three parallelly arranged, relatively shiftable, shift rails slidably mounted in said casing, a shift lever selectively engageable with said shift rails to effect shift thereof, an outer rail locking plate bridging said rails and having anchor portions at opposite sides thereof engageable with mating formations in said casing to prevent shift of said outer rail locking plate lengthwise of said rails, said outer rail locking plate being slidably mounted in said casing and connected to said shift lever by a slotted connection that provides for movement of the outer rail locking plate transversely of said rails whereby said anchor portions of said outer rail locking plate may be selectively engaged with the outer of said shift rails and said casing to prevent movement thereof lengthwise of said rails, and a pair of center rail locking plates each having an anchor portion simultaneously engageable with portions of an outer rail and with the center rail to prevent relative shifting movement therebetween, said center rail locking plates each having slotted portions engageable with said shift lever to provide for shift lever effected shift of the center rail locking plates in directions both transversely and longitudinally of said shift rails, and pin and slot means connecting said center rail locking plates to said outer rail locking plate permitting relative movement between said pin connected plates lengthwise of the rails, the anchor portions of said locking plates being so proportioned that the shift lever engaged rail is always anchored to the casing before the shift lever is completely disengaged therefrom so as to prevent movement of the shift rails independently of the shift lever.

6. In a shiftable gear transmission, a casing, three parallelly arranged, relatively shiftable shift rails slidably mounted in said casing, a shift lever selectively engageable with said shift rails to effect shift thereof, an outer rail locking plate bridging the shift rails and having depending portions formed with anchor studs engageable with anchor formations in said casing to prevent movement of said outer rail locking plate lengthwise of said rails, said outer rail locking plate being mounted in said casing for slidable movement transversely of said rails whereby each of the anchor studs thereof may be selectively engaged with one of the outer rails to lock the anchor stud engaged outer rail to said casing while the other outer rail is free to be shifted in a direction lengthwise of the rail, means connecting said shift lever to said outer rail locking plate for effecting shift thereof transversely of said rails, and a pair of center rail locking plates arranged between said outer rail locking plate and said shift rails, each of said center rail locking plates having a depending portion providing an anchor stud that is slidably anchored in one of said outer rails for movement transversely of the shift rails to permit selective engagement of each of the last mentioned anchor studs with a mating recess in the center shift rail whereby the center shift rail can be selectively anchored to either of the outer shift rails, means connecting each of said center rail locking plates to said shift lever to provide for movement thereby, and means connecting each of said center rail locking plates to said outer rail locking plate permitting relative movement between said plates in a direction lengthwise of said rails.

7. In a shiftable gear transmission, a casing, three parallelly arranged, relatively shiftable shift rails slidably mounted in said casing, a shift lever selectively engageable with said shift rails to effect shift thereof, an outer rail locking plate bridging the shift rails and having depending portions formed with anchor studs engageable with anchor formations in said casing to prevent movement of said outer rail locking plate lengthwise of said rails, said outer rail locking plate being mounted in said casing for slidable movement transversely of said rails whereby each of the anchor studs thereof may be selectively engaged with one of the outer rails to lock the anchor stud engaged outer rail to said casing while the other outer rail is free to be shifted in a direction lengthwise of the rail, means connecting said shift lever to said outer rail locking plate for effecting shift thereof transversely of said rails, and a pair of center rail locking plates arranged between said outer rail locking plate and said shift rails, each of said center rail locking plates having a depending portion providing an anchor stud that is slidably anchored in one of said outer rails for movement transversely of the shift rails to permit selective engagement of each of the last mentioned anchor studs with a mating recess in the center shift rail whereby the center shift rail can be selectively anchored to either of the outer shift rails, means connecting each of said center rail locking plates to said shift lever to provide for movement thereby, and means connecting each of said center rail locking plates to said outer rail locking plate permitting relative movement between said plates in a direction lengthwise of said rails, the anchor studs on said shift rail locking plates being so proportioned that the shift lever engaged shift rail is always anchored to the casing before the shift lever is disengaged therefrom so as to prevent movement of the shift rails independently of the shift lever.

8. In a shiftable gear transmission, a casing, three parallelly arranged, relatively shiftable shift rails slidably mounted in said casing, a shift lever selectively engageable with said shift rails to effect shift thereof, an outer rail locking plate of inverted U-shaped cross sectional configuration bridging the shift rails and having the depending leg portions thereof formed with anchor studs engageable with anchor formations in said casing to prevent movement of said outer rail locking plate lengthwise of said rails, said outer rail locking plate being mounted in said casing for slidable movement transversely of said rails whereby each of the anchor studs thereof may be selectively engaged with one of the outer rails to lock the anchor stud engaged outer rail to said casing while the other outer rail is free to be shifted in a direction lengthwise of the rail, means connecting said shift lever to said outer rail locking plate for effecting shift thereof transversely of said rails, and a pair of center rail locking plates of inverted L-shaped cross sectional configuration arranged between said outer rail locking plate and said shift rails, each of said center rail locking plates having a depending leg portion providing an anchor stud that is slidably anchored in one of said outer rails for movement transversely of the shift rails to permit selective engagement of each of the last mentioned anchor studs with a mating recess in the center shift rail whereby the center shift rail can be selectively anchored to either of the outer shift rails, means connecting each of said center rail locking plates to said shift lever to provide for movement thereby, and means connecting each of said center rail locking plates to said outer rail locking plate permitting relative movement between said plates in a direction lengthwise of said rails.

9. In a shiftable gear transmission, a casing, three parallelly arranged, relatively shiftable shift rails slidably mounted in said casing, a shift lever selectively engageable with said shift rails to effect shift thereof, an outer rail locking plate of inverted U-shaped cross sectional configuration bridging the shift rails and having the depending leg portions thereof formed with anchor studs engageable with mating slot-like anchor formations formed in said casing to prevent movement of said outer rail locking plate lengthwise of said rails, said anchor studs and casing anchor formations mounting said outer rail locking plate in said casing for slidable movement transversely of said rails whereby each of the anchor studs thereof may be selectively engaged with one of the outer rails to lock the anchor stud engaged outer rail to said casing while the other outer rail is free to be shifted in a direction lengthwise of the rail, a slot in said outer rail locking plate engaged with said shift lever and connecting said shift lever to said outer rail locking plate to provide for shift thereof transversely of said rails, and a pair of center rail locking plates of inverted L-shaped cross sectional configuration arranged between said outer rail locking plate and said shift rails, each of said center rail locking plates having a depending leg portion providing an anchor stud that is slidably anchored in one of said outer rails for movement transversely of the shift rails to permit selective engagement of each of the last mentioned anchor studs with a mating recess in the center shift rail whereby the center shift rail can be selectively anchored to either of the outer shift rails, slotted formations in each of said center rail locking plates engaged with said shift lever and connecting each of said center rail locking plates to said shift lever to provide for movement thereof by said shift lever in directions transversely of and lengthwise of said shift rails, and pin and slot means connecting each of said center rail locking plates to said outer rail locking plate permitting relative movement between said plates in a direction lengthwise of said rails.

10. In a shiftable gear transmission, a casing, three parallelly arranged, relatively shiftable shift rails slidably mounted in said casing, a shift lever selectively engageable with said shift rails to effect shift thereof, an outer rail locking plate of inverted U-shaped cross sectional configuration bridging the shift rails and having the depending leg portions thereof formed with anchor studs engageable with mating slot-like anchor formations formed in said casing to prevent movement of said outer rail locking plate lengthwise of said rails, said anchor studs and casing anchor formations mounting said outer rail locking plate in said casing for slidable movement transversely of said rails whereby each of the anchor studs thereof may be selectively engaged with one of the outer rails to lock the anchor stud engaged outer rail to said casing while the other outer rail is free to be shifted in a direction lengthwise of the rail, a slot in said outer rail locking plate engaged with said shift lever and connecting said shift lever to said outer rail locking plate to provide for shift thereof transversely of said rails, and a pair of center rail locking plates of inverted L-shaped cross sectional configuration arranged between said outer rail locking plate and said shift rails, each of said center rail locking plates having a depending leg portion providing an anchor stud that is slidably anchored in one of said outer rails for movement transversely of the shift rails to permit selective engagement of each of the last mentioned anchor studs with a mating recess in the center shift rail whereby the center shift rail can be selectively anchored to either of the outer shift rails, slotted formations in each of said center rail locking plates engaged with said shift lever and connecting each of said center rail locking plates to said shift lever to provide for movement thereof by said shift lever in directions transversely of and lengthwise of said shift rails, and pin and slot means connecting each of said center rail locking plates to said outer rail locking plate permitting relative movement between said plates in a direction lengthwise of said rails, the anchor studs on said shift rail locking plates being so proportioned that the shift lever engaged shift rail is always anchored to the casing before the shift lever is disengaged therefrom so as to prevent movement of the shift rails independently of the shift lever.

11. A shift rail locking means for a shift lever operated shiftable gear transmission having three parallelly arranged, relatively shiftable shift rails that are slidably mounted in the transmission casing, comprising an outer rail locking plate of inverted U-shaped cross sectional configuration adapted to bridge the shift rails, said outer rail plate having depending leg portions formed with anchor studs adapted to be engaged with mating anchor formations in the transmission casing to prevent movement of said outer rail locking plate lengthwise of said rails, said outer rail locking plate being adapted to be mounted in said casing for slidable movement transversely of said rails whereby each of the anchor studs thereof may be selectively engaged with one of the transmission outer rails to lock the anchor stud engaged outer rail to said casing while the other outer rail is free to be shifted in a direction lengthwise of the rail, means on said outer rail plate for connecting the transmission shift lever to said outer rail locking plate for effecting shift thereof transversely of said rails, and a pair of center rail locking plates of inverted L-shaped cross sectional configuration adapted to be arranged between said outer rail locking plate and said shift rails, each of said center rail locking plates having a leg portion providing a depending anchor stud that is adapted to be slidably anchored in one of said outer rails for movement transversely of the shift rails to permit selective engagement of the last-mentioned anchor studs with a mating recess in the center shift rail whereby the center shift rail can be selectively anchored to either of the outer shift rails, means on said center rail locking plates for connecting each of said center rail locking plates to the transmission shift lever to provide for movement of the center rail plates by the shift lever, and pin and slot means connecting each of said center rail locking plates to said outer rail locking plate permitting relative movement between said plates in a direction lengthwise of said rails.

12. In a shiftable gear transmission, a casing, three parallelly arranged, relatively shiftable, shift rails slidably mounted in said casing, a shift lever selectively engageable with said shift rails to effect shift thereof, an outer rail locking member having anchor portions engageable with mating formations in said casing to prevent shift of said outer rail locking member lengthwise of said rails, said outer rail locking member being slidably mounted in said casing and connected to said shift lever for movement thereby transversely of said rails whereby portions of said outer rail locking member may be selectively engaged with the outer of said shift rails to prevent lengthwise shift thereof, and a pair of center rail locking members each having an anchor portion selectively and simultaneously engageable with portions of an outer rail and with the center rail to prevent relative shifting movement therebetween, said center rail locking members each having other portions engageable with said shift lever to provide for shift of the center rail locking members by said shift lever, and means connecting said center rail locking members to said outer rail locking member permitting relative movement between said connected members lengthwise of the rails.

13. In a shiftable gear transmission, a casing, three parallelly arranged, relatively shiftable shift rails slidably mounted in said casing, a shift lever selectively engageable with said shift rails to effect shift thereof, an outer rail locking member having portions providing anchor studs engageable with anchor formations in said casing to prevent movement of said outer rail locking member lengthwise of said rails, said outer rail locking member being mounted in said casing for slidable movement transversely of said rails whereby each of the anchor studs thereof may be selectively engaged with one of the outer rails to lock the anchor stud engaged outer rail to said casing while the other outer rail is free to be shifted in a direction lengthwise of the rail, means for selectively connecting said shift lever to said outer rail locking member for effecting shift thereof transversely of said rails, and a pair of center rail locking members, each of said center rail locking members having an anchor stud that is slidably engaged in one of said outer rails for movement transversely of the shift rails to permit selective engagement of each of the last mentioned anchor studs with a mating recess in the center shift rail whereby the center shift rail can be selectively anchored to either of the outer shift rails, means for selectively connecting each of said center rail locking members to said shift lever to provide for shifting movement thereof by said shift lever, and means connecting each of said center rail locking members to said outer rail locking member permitting relative movement between said members in a direction lengthwise of said rails.

No references cited.